(12) United States Patent
Choi et al.

(10) Patent No.: US 8,628,698 B2
(45) Date of Patent: Jan. 14, 2014

(54) RESIN COMPOSITION FOR PROTECTION LAYER OF COLOR FILTER, PROTECTION LAYER OF COLOR FILTER USING SAME AND IMAGE SENSOR INCLUDING SAME

(75) Inventors: Se-Young Choi, Uiwang-si (KR);
Jae-Hyun Kim, Seongnam-si (KR);
Nam-Gwang Kim, Uiwang-si (KR);
Eui-June Jeong, Seoul (KR);
Sang-Kyun Kim, Uiwang-si (KR);
Kwen-Woo Han, Seoul (KR);
Hyun-Hoo Sung, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 363 days.

(21) Appl. No.: 12/842,063

(22) Filed: Jul. 23, 2010

(65) Prior Publication Data

US 2011/0156185 A1 Jun. 30, 2011

(30) Foreign Application Priority Data

Dec. 28, 2009 (KR) ........................ 10-2009-0132215

(51) Int. Cl.
*F21V 9/00* (2006.01)
*G02B 5/23* (2006.01)

(52) U.S. Cl.
USPC ........... 252/582; 252/583; 252/586; 252/588; 252/589; 430/269; 430/270.1; 430/281.1; 430/286.1; 430/287.1; 430/288.1; 430/300; 430/301; 430/322; 430/320; 430/321; 430/330; 522/150; 522/153; 522/134; 522/113; 522/126; 522/178; 522/183; 428/1.1; 428/1.2; 428/1.3; 428/1.33; 257/428; 257/432; 257/414

(58) Field of Classification Search
USPC ......... 522/150, 153, 134, 113, 126, 178, 183; 430/269, 270.1, 281.1, 286.1, 268.1, 430/287.1, 288.1, 300, 301, 311, 320, 321, 430/330; 428/1.2, 1.1, 1.3, 1.33; 257/428, 257/432, 414; 252/582, 583, 586
See application file for complete search history.

(56) References Cited

U.S. PATENT DOCUMENTS

| | | | |
|---|---|---|---|
| 4,490,461 A * | 12/1984 | Webb et al. | 430/510 |
| 5,563,011 A | 10/1996 | Shipley | |
| 6,410,206 B1 | 6/2002 | Ueda et al. | |
| 6,432,614 B1 | 8/2002 | Ueda et al. | |
| 6,627,364 B2 | 9/2003 | Kiguchi et al. | |
| 6,686,120 B2 * | 2/2004 | Lee et al. | 430/191 |
| 7,416,821 B2 | 8/2008 | De et al. | |
| 7,851,789 B2 | 12/2010 | Lee et al. | |
| 7,985,782 B2 | 7/2011 | Lee et al. | |
| 8,029,951 B2 * | 10/2011 | Motoki et al. | 430/7 |
| 2006/0084736 A1 | 4/2006 | Jang et al. | |
| 2008/0081268 A1* | 4/2008 | Motoki et al. | 430/7 |

FOREIGN PATENT DOCUMENTS

| | | |
|---|---|---|
| CN | 101131511 | 2/2008 |
| JP | 02-298901 | 12/1990 |
| JP | 11-292930 | 10/1999 |
| JP | 11-326623 | 11/1999 |
| JP | 11-349631 | 12/1999 |
| JP | 2000-105456 | 4/2000 |
| JP | 2000-310706 A | 11/2000 |
| JP | 2001-194797 | 7/2001 |
| KR | 10-2000-0012118 A | 2/2000 |
| KR | 10-2000-0058201 A | 9/2000 |
| KR | 10-2003-0071929 A | 9/2003 |
| KR | 10-0642446 A | 4/2006 |
| KR | 10-2007-0029157 A | 3/2007 |
| KR | 10-2007-0079864 A | 8/2007 |
| KR | 10-2008-0057118 A | 6/2008 |
| KR | 10-0918691 A | 6/2009 |
| WO | 2009/048262 A2 | 4/2009 |

OTHER PUBLICATIONS

Taiwanese Search Report in counterpart Taiwanese Application No. 099114367 dated Feb. 6, 2013, pp. 1.

* cited by examiner

*Primary Examiner* — Sanza McClendon
(74) *Attorney, Agent, or Firm* — Additon, Higgins, Pendleton & Ashe, P.A.

(57) ABSTRACT

Disclosed is a resin composition for a protective layer of a color filter including an acrylate-based resin including a repeating unit represented by each of Chemical Formulae 1 to 3, a melamine-based resin represented by Chemical Formula 4, a thermal acid generator (TAG), and a solvent.

9 Claims, 5 Drawing Sheets

RESIN COMPOSITION FOR PROTECTION LAYER OF COLOR FILTER, PROTECTION LAYER OF COLOR FILTER USING SAME AND IMAGE SENSOR INCLUDING SAME

CROSS-REFERENCE TO RELATED APPLICATION

This application claims priority to and the benefit of Korean Patent Application No. 10-2009-0132215 filed in the Korean Intellectual Property Office on Dec. 28, 2009, the entire disclosure of which is incorporated herein by reference.

FIELD OF THE INVENTION

The present invention relates to a resin composition for a protective layer of a color filter, a protective layer of a color filter manufactured using the same, and an image sensor including the same.

BACKGROUND OF THE INVENTION

An image sensor is a device including several million photoelectric conversion devices for converting light into an electric signal, depending upon the intensity of the light received by the device. Image sensors can be used in digital input devices, which enable digitalizing recorded images. There is a rapidly increasing demand for such devices for use in various applications such as security devices and digital portals.

Image sensors include a pixel array in which a plurality of pixels is arranged in a matrix form, and each pixel includes a photo-sensing device and a transmitting and signal output device. Image sensors are broadly categorized as charge coupled device (CCD) image sensors or complementary metal oxide semiconductor (CMOS) image sensors, depending upon the transmitting and signal output device. The CMOS image sensor concentrates the outside light through a micro-lens, the concentrated light is transmitted to a photo-sensing device such as a photodiode and the signal is output.

CMOS image sensors can be further modified to increase resolution, and recently research on decreasing pixel size to 1 μm or less has been undertaken. As pixel size decreases to 1 μm or less, however, consideration must be given to the geometric optical aspect and wave optical aspect in relation to the micro-lens since the size of the unit pixel can be up to 1.5 times the visible ray wavelength. Further, as the unit pixel becomes smaller, the diameter of the micro-lens becomes smaller. Thereby, a crosstalk phenomenon between adjacent pixels can more easily occur unless the focal distance of the lens is decreased. Decreasing the focal distance of the lens can, however, deteriorate resolution. In order to solve this problem, the thickness of each layer formed between the photodiode and the micro-lens may be decreased.

In addition, technology in which light is collected after changing a light path entering regions other than an optic detector may increase optical sensitivity. This light collection is performed using an image sensor including micro-lenses on a color filter. The resolution of an image sensor is largely determined by the surface characteristics of the micro-lenses. Furthermore, the surface characteristics of the micro-lenses largely depend on the material used to make the micro-lenses.

Micro-lenses can be formed by disposing an overcoat on a color filter and etching a part of the overcoat into a lens shape. Since a part of the etched surface of the overcoat works as a micro-lens, there continues to be active research directed to an overcoat material for determining the surface characteristics.

Korean Laid-open Patent No. 2008-0057118 discloses a thermosetting resin composition for a protective layer of a color filter that can have excellent adhesion strength, transparency, layer strength, heat resistance, acid resistance, alkali resistance, and storage length. However, the thermosetting resin composition can have poor stability against self-curing. Accordingly, there is a need for a new resin composition for a protective layer of a color filter.

SUMMARY OF THE INVENTION

An exemplary embodiment of the present invention provides a resin composition for a protective layer of a color filter that can have high stability against self-curing, excellent chemical resistance, and excellent flatness when it is used to form a protective layer of a color filter.

Another embodiment of the present invention provides a protective layer of a color filter, which is formed using the resin composition for a protective layer of a color filter.

Yet another embodiment of the present invention provides an image sensor including the protective layer of a color filter.

According to an embodiment of the present invention, provided is a resin composition for a protective layer of a color filter, which includes: (A) an acrylate-based resin including a repeating unit represented by each of the following Chemical Formulae 1 to 3; (B) a melamine-based resin represented by the following Chemical Formula 4; (C) a thermal acid generator (TAG); and (D) a solvent.

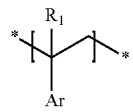

[Chemical Formula 1]

In Chemical Formula 1,
$R_1$ is hydrogen or substituted or unsubstituted C1 to C10 alkyl, and
Ar is substituted or unsubstituted aryl.

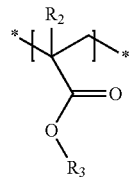

[Chemical Formula 2]

In Chemical Formula 2,
$R_2$ is hydrogen or substituted or unsubstituted C1 to C10 alkyl, and
$R_3$ is substituted or unsubstituted C1 to C10 alkyl.

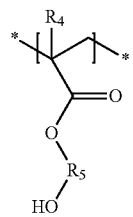

[Chemical Formula 3]

In Chemical Formula 3, $R_4$ is hydrogen or substituted or unsubstituted C1 to C10 alkyl, and $R_5$ is substituted or unsubstituted C1 to C10 alkyl.

[Chemical Formula 4]

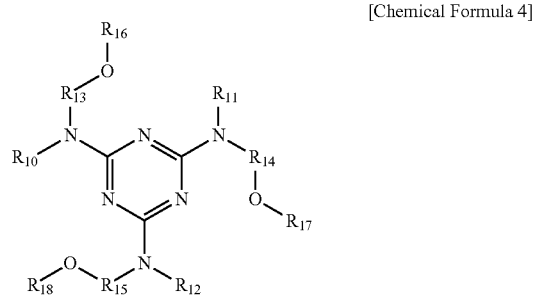

In Chemical Formula 4, $R_{10}$ to $R_{12}$ are independently hydrogen or ROR', wherein R is substituted or unsubstituted C1 to C10 alkyl and R' is hydrogen or substituted or unsubstituted C1 to C10 alkyl, $R_{13}$ to $R_{15}$ are independently substituted or unsubstituted C1 to C10 alkyl, and $R_{16}$ to $R_{18}$ are independently hydrogen or substituted or unsubstituted C1 to C10 alkyl.

The acrylate-based resin (A) can include: about 5 to about 80 mol % of a repeating unit represented by Chemical Formula 1; about 1 to about 70 mol % of a repeating unit represented by Chemical Formula 2; and about 10 to about 45 mol % of a repeating unit represented by Chemical Formula 3.

The acrylate-based resin (A) may have a weight average molecular weight (MW) ranging from about 1000 to about 100,000.

The solvent (D) may include propyleneglycol monopropylether.

The resin composition for a protective layer of a color filter may include: about 40 to about 90 wt % of the acrylate-based resin (A); about 1 to about 10 wt % of the melamine-based resin (B); about 0.1 to about 0.5 wt % of the thermal acid generator (C); and the balance amount of a solvent (D).

The resin composition for a protective layer of a color filter may further include a surfactant (E).

According to another embodiment of the present invention, provided is a protective layer of a color filter, which is formed using a composition for a protective layer of a color filter.

Yet another embodiment of the present invention provides an image sensor including a protective layer of a color filter according to one embodiment of the present invention as an overcoat or an overcoat combined with micro-lenses.

The present invention provides a resin composition for a protective layer of a color filter that can have high stability against self-curing and excellent chemical resistance and flatness when used to form a protective layer of a color filter.

DETAILED DESCRIPTION

Figure 1:
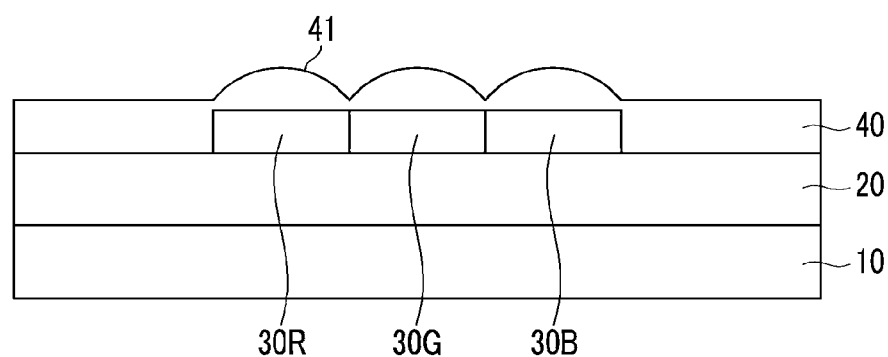
FIG. 1 is a schematic diagram showing an image sensor according to one embodiment of the present invention.

The present invention now will be described more fully hereinafter in the following detailed description of the invention and with reference to the accompanying drawings, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a definition is not otherwise provided, the term "substituted" refers to one substituted with one or more substituents comprising halogen (F, Br, Cl, or I), hydroxy, nitro, cyano, amino (—NRR', wherein R and R' are independently C1 to C10 alkyl), amidino, hydrazine, hydrazone, carboxyl, substituted or unsubstituted alkyl, substituted or unsubstituted aryl, substituted or unsubstituted cycloalkyl, substituted or unsubstituted heteroalkyl, substituted or unsubstituted heteroaryl, or substituted or unsubstituted heterocycloalkyl instead of hydrogen in a functional group, one substituted with one or more substituents comprising =O, =S, =NR (R is C1 to C10 alkyl), =PR (R is C1 to C10 alkyl), or =CRR' (R and R' are independently C1 to C10 alkyl) instead of two hydrogens, and one substituted with one or more substituents comprising ≡N, ≡P, or ≡CR (R is C1 to C10 alkyl) instead of three hydrogens, or a combination of any of the foregoing.

As used herein, when a definition is not otherwise provided, the term "alkyl" refers to C1 to C30 alkyl, for example C1 to C15 alkyl, the term "cycloalkyl" refers to C3 to C30 cycloalkyl, for example C3 to C18 cycloalkyl, the term "aryl" refers to C6 to C30 aryl, for example C6 to C18 aryl, the term "heteroalkyl" refers to C2 to C30 heteroalkyl, the term "heteroaryl" refers to C2 to C30 heteroaryl, and the term "heterocycloalkyl" refers to C2 to C30 heterocycloalkyl.

As used herein, when a definition is not otherwise provided, the term "hetero" refers to one including one or more heteroatoms including N, O, S, P, or a combination thereof.

In this specification, "combination" refers to mixing or copolymerization unless there is a particular comment or definition otherwise.

In addition, "*" of chemical formulae in this specification indicates the same or different atoms or part linking or connected to a chemical formula.

In the drawings, the thickness of layers, films, panels, regions, etc., are not necessarily to scale and may be exaggerated for clarity.

According to one embodiment of the present invention, the resin composition for a protective layer of a color filter includes: (A) an acrylate-based resin including a repeating unit represented by each of the following Chemical Formulae 1 to 3; (B) a melamine-based resin represented by the following Chemical Formula 4; (C) a thermal acid generator (TAG); and (D) a solvent.

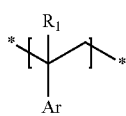

[Chemical Formula 1]

In Chemical Formula 1,
$R_1$ is hydrogen or substituted or unsubstituted C1 to C10 alkyl, and
Ar is substituted or unsubstituted aryl.

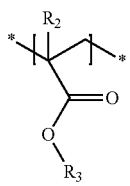

[Chemical Formula 2]

In Chemical Formula 2,
$R_2$ is hydrogen or substituted or unsubstituted C1 to C10 alkyl, and
$R_3$ is substituted or unsubstituted C1 to C10 alkyl.

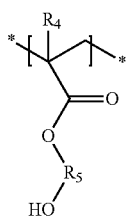

[Chemical Formula 3]

In Chemical Formula 3,
$R_4$ is hydrogen or substituted or unsubstituted C1 to C10 alkyl, and
$R_5$ is substituted or unsubstituted C1 to C10 alkyl.

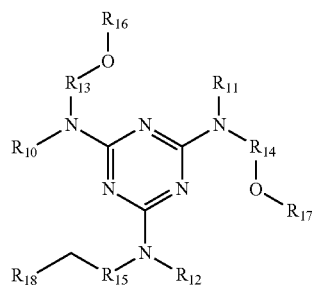

[Chemical Formula 4]

In Chemical Formula 4,
$R_{10}$ to $R_{12}$ are independently hydrogen or ROR', wherein R is substituted or unsubstituted C1 to C10 alkyl and R' is hydrogen or substituted or unsubstituted C1 to C10 alkyl,
$R_{13}$ to $R_{15}$ are independently substituted or unsubstituted C1 to C10 alkyl, and
$R_{16}$ to $R_{18}$ are independently hydrogen or substituted or unsubstituted C1 to C10 alkyl.

In addition, the resin composition for a protective layer of a color filter may further include one or more other additives such as (E) a surfactant and the like if necessary.

Hereinafter, each component will be illustrated in detail.

(A) Acrylate-Based Resin

The resin composition for a protective layer of a color filter includes an acrylate-based resin including a repeating unit represented by each of the following Chemical Formulae 1 to 3.

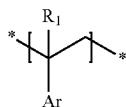

[Chemical Formula 1]

In Chemical Formula 1,
$R_1$ is hydrogen or substituted or unsubstituted C1 to C10 alkyl, and
Ar is substituted or unsubstituted aryl.

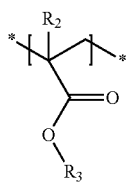

[Chemical Formula 2]

In Chemical Formula 2,
$R_2$ is hydrogen or substituted or unsubstituted C1 to C10 alkyl, and
$R_3$ is substituted or unsubstituted C1 to C10 alkyl.

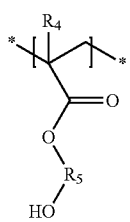

[Chemical Formula 3]

In Chemical Formula 3,
$R_4$ is hydrogen or substituted or unsubstituted C1 to C10 alkyl, and
$R_5$ is substituted or unsubstituted C1 to C10 alkyl.

The repeating unit included in the acrylate-based resin and represented by Chemical Formulae 1 to 3 can increase storage stability of a protective layer of a color filter as a repeating unit that does not cause self curing within a molecule.

Examples of Chemical Formula 1 include without limitation a repeating unit polymerized from a styrene monomer, examples of Chemical Formula 2 include without limitation a repeating unit polymerized from methylmethacrylate, and examples of Chemical Formula 3 include without limitation a repeating unit polymerized from 2-hydroxyethylmethacrylate.

The acrylate-based resin may include about 5 to about 80 mol %, for example about 20 to about 65 mol %, of a repeating unit represented by Chemical Formula 1. In some embodiments, the acrylate-based resin may include a repeating unit of Chemical Formula 1 in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of a repeating unit for Chemical Formula 1 can be in a range from about any of the foregoing amounts to about any other of the foregoing amounts. When a repeating unit represented by Chemical Formula 1 is included in an amount within these ranges, it can allow easy control of molecular weight.

In addition, the acrylate-based resin may include a repeating unit represented by Chemical Formula 2 in an amount ranging from about 1 to about 70 mol %, for example about 10 to about 55 mol %. In some embodiments, the acrylate-based resin may include a repeating unit of Chemical Formula 2 in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 mol %. Further, according to some embodiments of the present invention, the amount of a repeating unit for Chemical Formula 2 can be in a range from about any of the foregoing amounts to about any other of the foregoing amounts. When the repeating unit represented by Chemical Formula 2 is included in an amount within these ranges, it may have advantageous effects in terms of curing reaction.

Furthermore, the acrylate-based resin may include a repeating unit represented by Chemical Formula 3 in an amount ranging from about 10 to about 45 mol %, for example about 20 to about 35 mol %. In some embodiments, the acrylate-based resin may include a repeating unit of Chemical Formula 3 in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 mol %. Further, according to some embodiments of the present invention, the amount of a repeating unit for Chemical Formula 3 can be in a range from about any of the foregoing amounts to about any other of the foregoing amounts. When the repeating unit represented by Chemical Formula 3 is included in an amount within these ranges, it may provide resin stability.

The acrylate-based resin may be a copolymer including more than one repeating unit represented by any or all of Chemical Formulae 1 to 3. Exemplary copolymers include without limitation random copolymers, alternating copolymers, block copolymers, branch-type copolymers, and the like, and combinations thereof.

The acrylate-based resin may have a weight average molecular weight ranging from about 1000 to about 100,000 or from about 20,000 to about 60,000. When the acrylate-based resin has a weight average molecular weight within these ranges, it may have excellent solubility in a solvent and fluidity, and thus may be easily coated. It may also have excellent flatness when it is used to form a protective layer for a color filter.

The resin composition can include the acrylate-based resin in an amount ranging from about 40 to about 90 wt %, for example about 50 to about 70 wt %, based on the total weight of the resin composition for a protective layer of a color filter. In some embodiments, the acrylate-based resin may be included in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the acrylate-based resin can be in a range from about any of the foregoing amounts to about any other of the foregoing amounts. When the acrylate-based resin is included in an amount within these ranges, it can provide a desired thickness of a protective layer for a color filter and simultaneously increase storage stability.

(B) Melamine-Based Resin

The resin composition for a protective layer of a color filter may include a melamine-based resin represented by the following Chemical Formula 4.

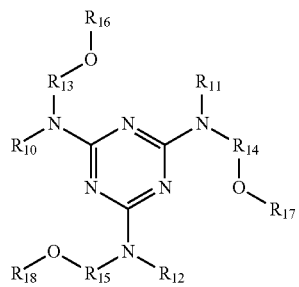

[Chemical Formula 4]

In Chemical Formula 4, $R_{10}$ to $R_{12}$ are independently hydrogen or ROR', wherein R is substituted or unsubstituted C1 to C10 alkyl and R' is hydrogen or substituted or unsubstituted C1 to C10 alkyl, $R_{13}$ to $R_{15}$ are independently substituted or unsubstituted C1 to C10 alkyl, and $R_{16}$ to $R_{18}$ are independently hydrogen or substituted or unsubstituted C1 to C10 alkyl.

The melamine-based resin may be a self-curable material, for example, CYMEL 303LF, Cymel-1130, Cymel-1168, or the like (Cytec Industries Inc.), and combinations thereof.

The resin composition for a protective layer of a color filter may include more than one melamine-based resin. The melamine-based resin may have a weight average molecular weight ranging from about 200 to about 1000.

The resin composition can include the melamine-based resin in an amount ranging from about 1 to about 10 wt %, for example about 2 to about 6 wt %, based on the total weight of the resin composition for a protective layer of a color filter. In some embodiments, the melamine-based resin may be included in an amount of about 1, 2, 3, 4, 5, 6, 7, 8, 9, or 10 wt %. Further, according to some embodiments of the present invention, the amount of the melamine-based resin can be in a range from about any of the foregoing amounts to about any other of the foregoing amounts. When the resin composition includes the melamine-based resin in an amount within these ranges, it may provide excellent physical characteristics of a cured layer and excellent flatness.

(C) Thermal Acid Generator

The resin composition for a protective layer of a color filter includes a thermal acid generator.

The thermal acid generator is a material that can bring about a curing reaction, and may include conventional various sulfonic acid amine salts and the like. It may have low volatility at a temperature ranging from about 170° C. to about 220° C., but is not limited thereto.

Examples of commercially available thermal acid generators useful in the present invention may include without limitation TAG-2179, TAG-2172, TAG-2396, and the like (available from King Industries Inc.), and combinations thereof.

The resin composition may include the thermal acid generator in an amount ranging from about 0.1 to about 0.5 wt %, based on the total weight of the resin composition for a protective layer of a color filter. In some embodiments, the acid generator may be included in an amount of about 0.1, 0.2, 0.3, 0.4, or 0.5 wt %. Further, according to some embodiments of the present invention, the amount of the acid generator can be in a range from about any of the foregoing amounts to about any other of the foregoing amounts. When the resin composition includes the acid generator in an amount within these ranges, it can exhibit excellent sensitivity, stability below a threshold temperature, and resolution after the reaction.

(D) Solvent

There is no particular limit on the solvent used and suitable solvents can be used singly or as a mixture or combination of two or more solvents.

Exemplary solvents include without limitation ethylene glycols including ethylene glycol and diethylene glycol; glycolethers including ethylene glycol monomethylether, diethylene glycol monomethylether, ethylene glycol diethylether, and diethylene glycol dimethylether; glycol ether acetates including ethylene glycol monoethyl ether acetate, diethylene glycol monoethyl ether acetate, and diethylene glycol monobutyl ether acetate; propylene glycol ethers including propylene glycol, propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, and dipropylene glycol diethyl ether; propylene glycol ether acetates including propylene glycol monomethyl ether acetate and dipropylene glycol monoethyl ether acetate; amides including N-methylpyrrolidone, dimethyl formamide, and dimethyl acetamide; ketones including methyl ethyl ketone (MEK), methyl isobutyl ketone (MIBK), and cyclohexanone; petroleum compounds including toluene, xylene, and naphtha solvent; esters including ethyl acetate, butyl acetate, and ethyl lactate; and the like, and combinations thereof. Propylene glycol monopropyl ether may provide excellent room temperature stability.

The solvent may be included in a balance amount based on the total weight of the resin composition for a protective layer of a color filter, or in an amount ranging from about 10 to about 60 wt %, based on the total weight of the resin composition for a protective layer of a color filter. In some embodiments, the solvent may be included in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments of the present invention, the amount of the solvent can be in a range from about any of the foregoing amounts to about any other of the foregoing amounts.

When the solvent is included in an amount within these ranges, it may provide appropriate viscosity of a resin composition, and thus can allow control thickness of a protective layer of a color filter.

(E) Other Additive

The resin composition for a protective layer of a color filter may further include one or more additional components or additives, such as but not limited to a surfactant and the like to improve the coating property, as well as components (A) to (D).

An exemplary surfactant may include without limitation R08 (commercially available from DIC: Dainippon Ink & Chemicals, Incorporated) and the like, and may be included in an amount of about 0.1 to about 5 parts by weight, based on about 100 parts by weight of the composition including components (A) to (D). In some embodiments, the surfactant may be included in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 parts by weight, based on about 100 parts by weight of the composition including components (A) to (D). Further, according to some embodiments of the present invention, the amount of the surfactant can be in a range from about any of the foregoing amounts to about any other of the foregoing amounts.

According to another embodiment of the present invention, provided is a protective layer of a color filter, which is prepared using the resin composition for a protective layer of a color filter.

The protective layer of a color filter may be prepared using conventional methods known in the art. For example, the resin composition for a protective layer of a color filter can be coated on a substrate and then cured. The coating method may include spin coating, printing, spray coating, roll coating, and the like. The curing can be performed using an oven and the like.

Yet another embodiment of the present invention provides an image sensor including the protective layer of a color filter as an overcoat or an overcoat combined with micro-lenses.

FIG. 1 is a schematic diagram showing an image sensor including a protective layer of a color filter as an overcoat combined with micro-lenses according to one embodiment of the present invention.

Referring to FIG. 1, an image sensor includes a substrate 10, a thin film device structure 20 on the substrate 10, red, green, and blue color filters 30R, 30G, and 30B sequentially formed on the surface of the thin film device structure 20, and a protective layer disposed thereon using a resin composition for a protective layer of a color filter according to one embodiment of the present invention and patterned to function as an overcoat 40 combined with micro-lenses 41. Herein, the micro-lenses 41 may have a large influence on the resolution of an image sensor. In addition, it may not have deteriorated surface characteristics during the etching, and thus may bring about excellent surface roughness after the etching.

Hereinafter, the embodiments are illustrated in more detail with reference to examples. However, the following are exemplary embodiments and are not limiting.

Synthesis of Acrylate-Based Resin

Synthesis Example 1

100 g of propylene glycol monoethyl ether acetate (PG-MEA) is added to a flask and then heated and agitated at 80° C. Next, 0.8 g of V-601 (Wako) is mixed with 32 g of styrene, 24 g of methyl methacrylate, and 24 g of 2-hydroxyethyl methacrylate. The mixture is agitated for more than one hour to be completely dissolved. This solution is added to the aforementioned flask in a dropwise fashion for 2 hours. Then, the resulting product is agitated for 4 hours, synthesizing a resin A including 34% of a solid and having a weight average molecular weight (MW) of 47,000.

Solid Powder Measurement 0.2 g of the resin A is dried at a 200° C. oven for 2 hours. A solid thereof is measured before and after drying.

Molecular Weight Measurement

GPC (Alliance 2695; Waters Co.) is used to measure weight average molecular weight.

Synthesis Example 2

A resin B including 27% of a solid and having a weight average molecular weight of 39,000 is synthesized according to the same method as Synthesis Example 1 except for using 48 g of styrene, 8 g of methyl methacrylate, and 24 g of 2-hydroxyethyl methacrylate instead of 32 g of styrene, 24 g of methyl methacrylate, and 24 g of 2-hydroxyethyl methacrylate in Synthesis Example 1.

Synthesis Example 3

A resin C including 30% of a solid and having a weight average molecular weight of 44,000 is synthesized according to the same method as Synthesis Example 1 except for using 37.33 g of styrene, 13.33 g of methyl methacrylate, and 29.33 g of 2-hydroxyethyl methacrylate instead of 32 g of styrene, 24 g of methyl methacrylate, and 24 g of 2-hydroxyethyl methacrylate in Synthesis Example 1.

Synthesis Example 4

A resin D including 35% of a solid and having a weight average molecular weight of 49,000 is synthesized according to the same method as Synthesis Example 1 except for using 21.33 g of styrene, 29.33 g of methyl methacrylate, and 29.33 g of 2-hydroxyethyl methacrylate instead of 32 g of styrene, 24 g of methyl methacrylate, and 24 g of 2-hydroxyethyl methacrylate in Synthesis Example 1.

Synthesis Example 5

A resin E including 36% of a solid and having a weight average molecular weight of 48,000 is synthesized according to the same method as Synthesis Example 1 except for using 16 g of styrene, 40 g of methyl methacrylate, and 24 g of 2-hydroxyethyl methacrylate instead of 32 g of styrene, 24 g of methyl methacrylate, and 24 g of 2-hydroxyethyl methacrylate in Synthesis Example 1.

Synthesis Example 6

A resin F including 24% of a solid and having a weight average molecular weight of 15,000 is synthesized according to the same method as Synthesis Example 1 except for using 3.8 g of V-601 (Wako), 13.5 g of styrene, 2.6 g of 2-hydroxyethyl methacrylate, 3.2 g of methacrylic acid, 8.3 g of glycidyl methacrylate, and 1.9 g of phenyl maleimide instead of 32 g of styrene, 24 g of methyl methacrylate, and 24 g of 2-hydroxyethyl methacrylate in Synthesis Example 1.

Synthesis Example 7

A resin G including 46% of a solid and having a weight average molecular weight of 48,000 is synthesized according to the same method as Synthesis Example 1 except for using 1.0 g of V-601 (Wako), 40 g of styrene, 20 g of 2-hydroxyethyl methacrylate, and 20 g of 3-methyl maleic anhydride instead of 32 g of styrene, 24 g of methyl methacrylate, and 24 g of 2-hydroxyethyl methacrylate in Synthesis Example 1.

The resins according to Synthesis Examples 1 to 7 are provided in the following Table 1.

TABLE 1

| Synthesis Example | 1 | 2 | 3 | 4 | 5 | 6 | 7 |
|---|---|---|---|---|---|---|---|
| Styrene [g] | 32 | 48 | 37.33 | 21.33 | 16 | 13.5 | 40 |
| Methyl methacrylate [g] | 24 | 8 | 13.33 | 29.33 | 40 | — | 20 |
| 2-hydroxyethyl methacrylate [g] | 24 | 24 | 29.33 | 29.33 | 24 | 2.6 | 2.0 |
| Methacrylic acid [g] | — | — | — | — | — | 3.2 | — |
| Glycidyl methacrylate [g] | — | — | — | — | — | 8.3 | — |
| Phenyl maleimide [g] | — | — | — | — | — | 1.9 | — |
| 3-methyl maleic anhydride [g] | — | — | — | — | — | — | 20 |
| V-601 [g] | 0.8 | 0.8 | 0.8 | 0.8 | 0.8 | 3.8 | 1.0 |
| PGMEA [g] | 100 | 100 | 100 | 100 | 100 | 100 | 100 |
| solid [%] | 34 | 27 | 30 | 35 | 36 | 24 | 46 |
| Weight average molecular weight (MW) | 47K | 39K | 44K | 49K | 48K | 15K | 48K |
| Resin | A | B | C | D | E | F | G |

Preparation of a Resin Composition for a Protective Layer of a Color Filter

Examples 1 to 7 and Comparative Examples 1 and 2

A resin composition for a protective layer of a color filter according to Examples 1 to 7 and Comparative Examples 1 and 2 is prepared by mixing components provided in the following Tables 2 to 4, then shaking the mixture for more than two hours with a machine and allowing it to stand for one hour, and filtrating it with a 0.45 μm filtering machine.

TABLE 2

|  | Example 1 | Example 2 |
|---|---|---|
| Resin A [g] | 70.2 | 59.3 |
| Cymel 303LF (Cymel Inc.) [g] | 3.72 | 3.29 |
| TAG-2179 (King industries Inc.) [g] | 0.5 | 0.1 |
| PGMEA [g] | 1.4 | — |
| Cyclohexanone (Anone) [g] | 24.0 | 24.9 |
| PGPE [g] | — | 12.4 |
| R08 [parts by weight] | 0.01 | 0.01 |

In Table 2, PGPE is propylene glycol monopropyl ether.

TABLE 3

|  | Example 3 | Example 4 | Example 5 | Example 6 | Example 7 |
|---|---|---|---|---|---|
| Resin B [g] | 58.4 | 58.6 | 58.8 | 59.3 | 59.1 |
| Cymel 303LF [g] | 3.2 | 3.3 | 3.3 | 3.3 | 3.3 |
| TAG-2179 [g] | 0.1 | 0.4 | 0.4 | 0.1 | 0.1 |
| PGMEA [g] | 13.3 | — | — | — | — |
| Anon [g] | 25.0 | 24.9 | 24.8 | 24.9 | 24.8 |
| PGPE [g] | — | 12.8 | 12.4 | 12.4 | 12.4 |
| TEA [g] | — | — | 0.2 | — | 0.2 |
| R08 [parts by weight] | 0.01 | 0.01 | 0.01 | 0.01 | 0.01 |

TABLE 4

|  | Comparative Example 1 | Comparative Example 2 |
|---|---|---|
| Resin 1 [g] | Resin G 73.92 | Resin A 59.3 |
| Resin 2 [g] | — | Cymel 303LF 3.29 |
| TAG-2179 [g] | 0.5 | — |
| PGMEA [g] | 1.4 | — |
| Anon [g] | 24.0 | 24.9 |
| R08 [parts by weight] | 0.01 | 0.01 |

In Table 4, the resins 1 and 2 indicate an acrylate-based resin and other resins.

Property Evaluation 1: Room Temperature Stability Measurement

The resin compositions for a protective layer of a color filter according to Examples 1 and 2 and a resin F are divided into several samples and stored at room temperature. The samples are respectively coated on a 4 inch silicon wafer for slope 5 seconds, for 20 seconds at 1500 rpm, and for slope 5 seconds again using a coater (Micasa Inc.), and then dried at 200° C. for 5 minutes. The thickness of the coated layers is measured using ST4000-DLX equipment (K-MAC Co.). The results are provided in FIGS. 1 and 2. Then, the resin compositions for a protective layer of a color filter are examined for changes as time passes.

Figure 2:
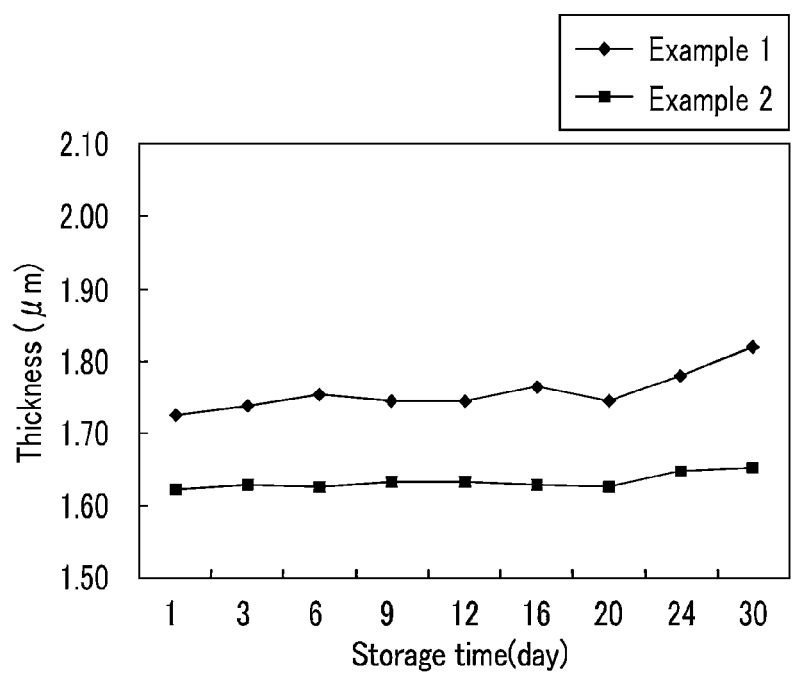
FIG. 2 is a graph showing room temperature stability measurements of a protective layer for a color filter according to Examples 1 and 2.
Figure 3:
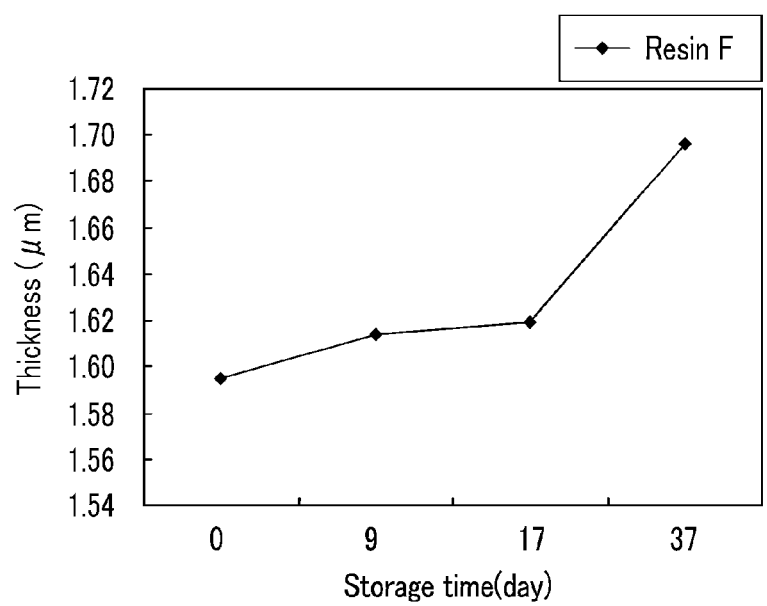
FIG. 3 is a graph showing room temperature stability measurements of a protective layer for a color filter according to Comparative Example 1.

FIG. 2 shows room temperature stability measurements of the resin compositions for a protective layer of a color filter according to Examples 1 and 2. FIG. 3 shows room temperature stability measurement of a resin F.

As shown in FIG. 2, the room temperature stability measurements of the resin compositions for a protective layer of a color filter of Examples 1 and 2 including a different solvent show that the resin composition including PGPE is more stable than the one including PGMEA.

As shown in FIG. 3, a resin F had a clear thickness change depending on time based on its room temperature stability result even though it is not prepared into a resin composition for a protective layer of a color filter.

Property Evaluation 2: Chemical Resistance Measurement

The resin compositions for a protective layer of a color filter according to Examples 3 to 7 and Comparative Examples 1 and 2 are respectively spin-coated to a thickness of 16,000 Å on a wafer for a CMOS image sensor having a 0.8 μm×2.0 μm trench at 200° C. for 5 minutes. The wafer is respectively dipped in propylene glycol monomethyl ether acetate (PGMEA), isopropyl alcohol (IPA), CD2000L (Shiny Co., Ltd.), and acetone for 10 minutes. Its thickness is measured using KST4000-DLX® (K-MAC Co.) and compared with the thickness before being dipped in the materials. The results are provided in the following Table 5.

Evaluation References

O: less than 3% of a thickness difference before and after being dipped in the following chemical materials X: more than 3% of a thickness difference before and after being dipped in the following chemical materials

TABLE 5

| Material | Examples | | | | | Comparative Examples | |
|---|---|---|---|---|---|---|---|
|  | 3 | 4 | 5 | 6 | 7 | 1 | 2 |
| PGMEA | O | O | O | O | O | O | X |
| IPA | O | O | O | O | O | O | X |
| CD2000L | O | O | O | O | O | O | X |
| Acetone. | O | O | O | O | O | X | X |

Referring to Table 5, the resin compositions of Examples 3 to 7 have excellent chemical resistance against PGMEA, IPA, CD200L, and acetone. The composition of Comparative Example 2 including no thermal acid generator has deteriorated chemical resistance, which shows that the composition is not properly cured.

Property Evaluation 3: Surface Roughness Measurement

The resin compositions for a protective layer of a color filter according to Examples 3 to 7 and Comparative Example 1 are respectively spin-coated to a thickness of 16,000 Å on an 8" silicon wafer and cured at 200° C. for 5 minutes, and then measured regarding each surface roughness using Unity85DD equipment made by Tokyo Electron Ltd. (TEL). The result is provided in the following Table 6. In addition, FIGS. 4 and 5 are photographs showing etched surfaces of protective layers using the resin compositions according to Example 3 and Comparative Example 1, respectively.

TABLE 6

|  | Example 3 | Example 4 | Example 5 | Example 6 | Example 7 | Comparative Example 1 |
|---|---|---|---|---|---|---|
| Surface roughness (nm) | 6.6 | 6.3 | 9.3 | 8.5 | 13.7 | 17.5 |

Figure 4:
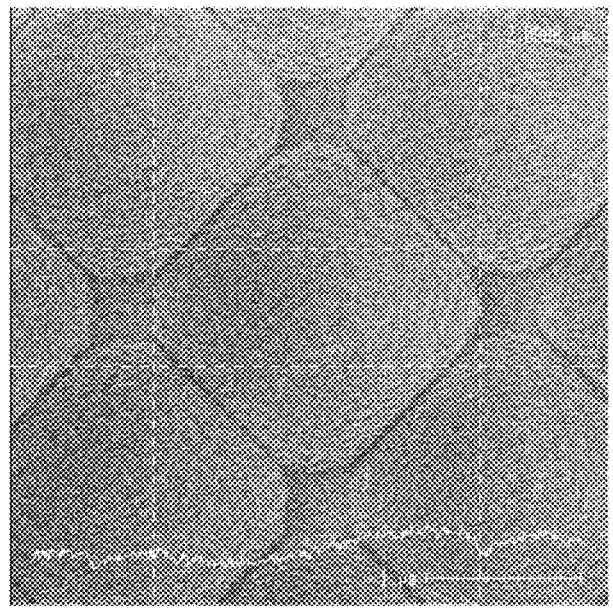
FIG. 4 shows a photograph showing an etched surface of a protective layer for a color filter using the resin composition according to Example 3.
Figure 5:
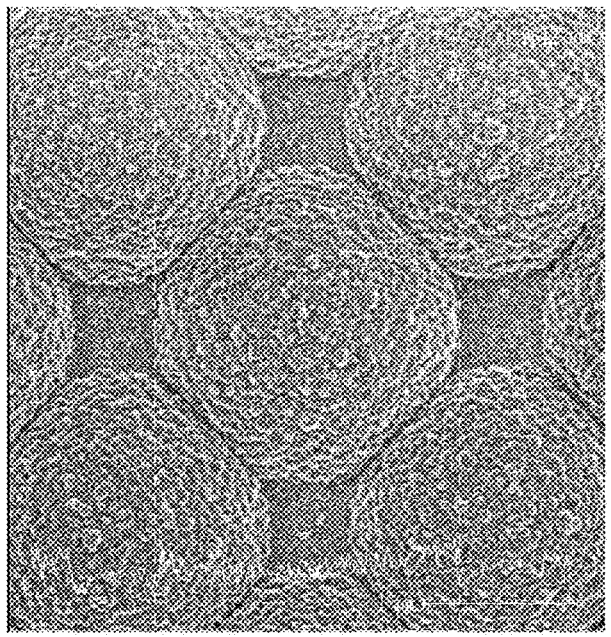
FIG. 5 is a photograph showing an etched surface of a protective layer for a color filter using the resin composition according to Comparative Example 1.

As shown in FIGS. 4 and 5 and Table 6, Examples 3 to 7 show lower surface roughness than Comparative Example 1 of 17.5 nm, which shows they have an excellent surface planarization rate.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A resin composition for a protective layer of a color filter, comprising:
   (A) an acrylate-based resin comprising about 5 to about 80 mol % of a repeating unit represented by the following Chemical Formula 1, about 1 to about 70 mol % of a repeating unit represented by the following Chemical Formula 2, and about 10 to about 45 mol % of a repeating unit represented by the following Chemical Formula 3;
(B) a melamine-based resin represented by the following Chemical Formula 4;
(C) a thermal acid generator (TAG); and
(D) a solvent:

[Chemical Formula 1]

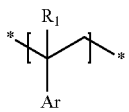

wherein, in Chemical Formula 1,
$R_1$ is hydrogen or substituted or unsubstituted C1 to C10 alkyl, and
Ar is substituted or unsubstituted aryl,

[Chemical Formula 2]

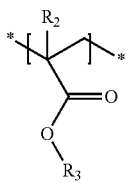

wherein, in Chemical Formula 2,
$R_2$ is hydrogen or substituted or unsubstituted C1 to C10 alkyl, and
$R_3$ is substituted or unsubstituted C1 to C10 alkyl,

[Chemical Formula 3]

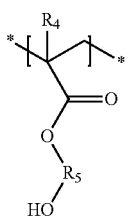

wherein, in Chemical Formula 3,
$R_4$ is hydrogen or substituted or unsubstituted C1 to C10 alkyl, and
$R_5$ is substituted or unsubstituted C1 to C10 alkyl,

[Chemical Formula 4]

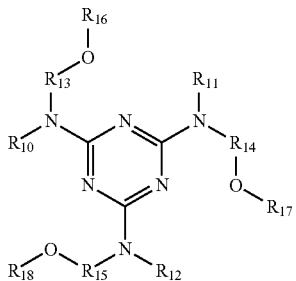

wherein, in Chemical Formula 4,
$R_{10}$ to $R_{12}$ are independently hydrogen or ROR', wherein R is substituted or unsubstituted C1 to C10 alkyl and R' is hydrogen or substituted or unsubstituted C1 to C10 alkyl,
$R_{13}$ to $R_{15}$ are independently substituted or unsubstituted C1 to C10 alkyl, and
$R_16$ to $R_{18}$ are independently hydrogen or substituted or unsubstituted C1 to C10 alkyl.

2. The resin composition of claim 1, wherein the acrylate-based resin (A) has a weight average molecular weight ranging from about 1,000 to about 100,000.

3. The resin composition of claim 1, wherein the solvent (D) comprises propylene glycol monopropyl ether.

4. The resin composition of claim 1, comprising: about 40 to about 90 wt % of the acrylate-based resin (A); about 1 to about 10 wt % of the melamine-based resin (B); about 0.1 to about 0.5 wt % of the thermal acid generator (C); and a balance of the solvent (D).

5. The resin composition of claim 1, further comprising a surfactant (E).

6. A protective layer of a color filter fabricated using a resin composition for a protective layer of a color filter according to claim 1.

7. An image sensor comprising a protective layer of a color filter according to claim 6 as an overcoat or an overcoat combined with micro-lenses.

8. The resin composition of claim 1, wherein the acrylate-based resin (A) comprises about 20 to about 35 mol % of the repeating unit represented by Chemical Formula 3.

9. The resin composition of claim 8, wherein the acrylate-based resin (A) comprises about 20 to about 65 mol % of the repeating unit represented by Chemical Formula 1 and about 10 to about 55 mol % of the repeating unit represented by Chemical Formula 2.

* * * * *